(12) United States Patent
Kanameda et al.

(10) Patent No.: US 6,181,998 B1
(45) Date of Patent: *Jan. 30, 2001

(54) START CONTROLLING METHOD FOR A PASSENGER PROTECTION SYSTEM, START CONTROLLING SYSTEM FOR A PASSENGER PROTECTION SYSTEM, AND RECORDING MEDIUM FOR RECORDING A START CONTROLLING PROGRAM FOR A PASSENGER PROTECTION SYSTEM

(75) Inventors: Yasumasa Kanameda; Koichi Miyaguchi, both of Tomioka (JP)

(73) Assignee: Airbag Systems Co., Ltd., Gunma (JP)

( * ) Notice: Under 35 U.S.C. 154(b), the term of this patent shall be extended for 0 days.

This patent is subject to a terminal disclaimer.

(21) Appl. No.: 09/223,719

(22) Filed: Dec. 31, 1998

(30) Foreign Application Priority Data

Mar. 19, 1998 (JP) .................................................. 10-089602

(51) Int. Cl.[7] .............................. G06F 7/00; G60R 22/00; G05D 3/00
(52) U.S. Cl. .............................. 701/45; 701/46; 280/735; 180/271; 180/282; 340/436; 340/669; 307/10.1
(58) Field of Search ................................. 701/45, 36, 46, 701/47; 280/734, 735, 731, 732, 802, 806; 180/271, 268, 282; 307/10.1; 340/436, 669

(56) References Cited

U.S. PATENT DOCUMENTS

| | | | |
|---|---|---|---|
| 5,440,485 | * 8/1995 | Okimoto et al. ...................... | 701/46 |
| 5,483,451 | * 1/1996 | Ohmae et al. ....................... | 701/46 |
| 5,490,067 | * 2/1996 | Teguri et al. ....................... | 701/46 |
| 5,530,649 | * 6/1996 | Fujishima ........................... | 701/46 |
| 5,542,700 | * 8/1996 | Shibata et al. ...................... | 701/46 |
| 5,742,916 | * 4/1998 | Bischoff et al. ..................... | 701/45 |
| 5,802,480 | * 9/1998 | Shiraishi ............................ | 701/45 |
| 5,999,871 | * 12/1999 | Liu .................................. | 701/45 |
| 6,036,225 | * 3/2000 | Foo et al. ........................... | 701/45 |

\* cited by examiner

*Primary Examiner*—Jacques H. Louis-Jacques
(74) *Attorney, Agent, or Firm*—Wenderoth, Lind & Ponack, LLP.

(57) ABSTRACT

A start control system for a passenger protection system wherein after a first inflator has been fired, a detected deceleration of the vehicle is compared with a previously stored predetermined deceleration. Next, time integration is executed over an area in which the detected deceleration of the vehicle exceeds the previously stored predetermined deceleration if it has been decided that the detected deceleration of the vehicle exceeds the previously stored predetermined deceleration to increase speed reduction. Then, the time integral value is added to a speed integral value which is calculated as time integration of the detected deceleration of the vehicle until a point of time when it has been decided that the detected deceleration of the vehicle exceeds the previously stored predetermined deceleration. Finally, a start signal for a second inflator is output by a CPU to fire the second inflator when an added result exceeds a predetermined threshold value. As a result, even if stagnation of the speed integral value is caused, the second inflator can be fired without fail.

6 Claims, 6 Drawing Sheets

START CONTROLLING METHOD FOR A PASSENGER PROTECTION SYSTEM, START CONTROLLING SYSTEM FOR A PASSENGER PROTECTION SYSTEM, AND RECORDING MEDIUM FOR RECORDING A START CONTROLLING PROGRAM FOR A PASSENGER PROTECTION SYSTEM

BACKGROUND OF THE INVENTION

1. Field of the Invention

The present invention relates to start control of a passenger protection system and, more particularly, to an improvement in start control of a two-stage passenger protection system which has two inflators and is constructed to fire them in order under predetermined conditions.

2. Description of the Related Art

In the prior art, in the passenger protection system which is represented by the air bag system, for example, such an air bag system that inflates an air bag at a time when a impact acceleration in excess of a predetermined reference is detected has been the mainstream. However, according to various later studies, experiments, etc., it becomes apparent that in some cases it is not always proper for the passenger protection to inflate the air bag at a stretch.

In recent years, various two-stage air bag systems have been proposed from a viewpoint of passenger protection (for example, see Patent Application Publication (KOKAI) Hei 2-310143, etc.). In such two-stage air bag systems, a first stage inflator is fired under predetermined conditions to inflate the air bag until a predetermined size, and then a second stage inflator is fired to inflate the air bag up to its maximum at a point of time when second predetermined conditions are satisfied.

In such two-stage air bag systems, it becomes an issue from a viewpoint of proper passenger protection how the first stage inflator and the second stage inflator should be fired.

As a relatively simple method of firing the inflators, for example, the start control can be thought of such that a deceleration caused in a crash is measured so as to calculate its integral value and then the first stage inflator and the second stage inflator are fired respectively when such integral value exceeds respective threshold values.

Such start control can be employed enoughly enoughly in practical use unless so-called stagnation of the integral value of the deceleration is caused between the fire of the first stage inflator and fire of the second stage inflator.

However, according to the type of the crash, sometimes such a phenomenon is produced that, since increase in the integral value of the deceleration becomes small, i.e., a stagnation state is generated after the first stage inflator has been fired, the integral value of the deceleration hardly exceeds the threshold value to generate firing of the second stage inflator, although fire of the second stage inflator is requested. For example, in the case of the so-called offset crash, because a part of constituent parts of the vehicle is damaged by the impact, sometimes the integral value of the deceleration is stagnated after the first stage inflator has been fired. In the above type of crash, the case is sometimes caused where, only if fire of the inflators is determined based on the decision whether or not the integral value of the deceleration exceeds the threshold value being set under aforementioned simple conditions, the second stage inflator cannot be fired in a period of time when fire of the second stage inflator is truly needed.

SUMMARY OF THE INVENTION

It is an object of the present invention to provide a start controlling method for a passenger protection system and a start controlling system for a passenger protection system both capable of executing start control of the passenger protection system which has two-stage inflator appropriately, and a recording medium for recording a start controlling program for the passenger protection system.

It is another object of the present invention to provide a start controlling method for a passenger protection system and a start controlling system for a passenger protection system both capable of firing a second inflator without fail if a crash needing to start fire of the second inflator occurs after a first inflator has been fired even under the situation that so-called stagnation of a time integral value of deceleration is caused, and a recording medium for recording a start controlling program for the passenger protection system.

In order to achieve the object of the present invention, according to a first aspect of the present invention, there is provided a start controlling method for a passenger protection system, for controlling start of the passenger protection system which has a first inflator and a second inflator and is constructed such that a protection system for protecting passengers of a vehicle is started by firing the first inflator and the second inflator respectively in response to a start signal from an external device, the method comprising the steps of:

detecting a deceleration of a vehicle;

calculating a speed integral value which is time integration of the deceleration;

deciding whether or not the speed integral value exceeds a first predetermined threshold value, and then starting the first inflator if it has been decided that the speed integral value exceeds the first predetermined threshold value;

comparing a detected deceleration of the vehicle with a previously stored predetermined deceleration for a first predetermined time after the first inflator has been started, then deciding whether or not the detected deceleration of the vehicle exceeds the previously stored predetermined deceleration to increase speed reduction, and then executing time integration over an area, in which the detected deceleration of the vehicle exceeds the previously stored predetermined deceleration, for a second predetermined time if it has been decided that the detected deceleration of the vehicle exceeds the previously stored predetermined deceleration to increase the speed reduction;

adding the time integral value to a speed integral value which is calculated as time integration of the detected deceleration of the vehicle until a point of time when it has been decided that the detected deceleration of the vehicle exceeds the previously stored predetermined deceleration to increase the speed reduction; and deciding whether or not an added result exceeds a second predetermined threshold value, and then executing start of the second inflator if it has been decided that the added result exceeds the second predetermined threshold value.

Such start controlling method has been made in view of the fact that, if increase of the speed integral value becomes slow, i.e., stagnation of the speed integral value is caused, after the first inflator has been fired but the deceleration in excess of a predetermined value is caused, fire of the second inflator must be needed.

More particularly, in various types of crashes which needs firing of the first inflator but does not need fire of the second inflator, data of change in the deceleration caused when the deceleration is increased up to its maximum (in other words, the acceleration is increased to the negative side) are collected previously according to the experiment, etc., and stored, and then the detected deceleration of the vehicle is compared with the stored deceleration after the first inflator has been fired. Then, if the detected deceleration of the vehicle exceeds the stored deceleration so as to increase speed reduction, time integration is carried out over an area, in which the detected deceleration of the vehicle exceeds the stored deceleration so as to increase speed reduction, until the desired fire time of the second inflator. Then, the integrated value is added to the speed integral value calculated at a point of time when it has been decided that the detected deceleration of the vehicle exceeds the stored deceleration so as to increase speed reduction. Then, when the added result exceeds a predetermined threshold value, start of the second inflator is executed. As a result, even if the stagnation of the speed integral value is caused, the second inflator can be fired without fail.

In order to achieve the object of the present invention, according to a second aspect of the present invention, there is provided a start controlling system for a passenger protection system, for controlling start of the passenger protection system which has a first inflator and a second inflator and is constructed such that a protection system for protecting passengers of a vehicle is started by firing the first inflator and the second inflator respectively in response to a start signal from an external device, the system comprising:

a first integrating means for executing time integration with respect to a deceleration of a vehicle input from an external device;

a first integral value deciding means for deciding whether or not a value calculated by the first integrating means exceeds a first predetermined threshold value;

an acceleration deciding means for deciding whether or not the deceleration of the vehicle input from the external device exceeds a previously stored predetermined deceleration after a point of time when it is decided by the first integral value deciding means that the value calculated by the first integrating means exceeds the first predetermined threshold value;

a second integrating means for executing time integration over an area, in which the deceleration of the vehicle input from the external device exceeds the previously stored predetermined deceleration, for a predetermined time after a point of time when it has been decided that the deceleration of the vehicle input from the external device exceeds the previously stored predetermined deceleration;

an adding means for adding an integral value, which is calculated by the first integrating means when it is decided by the acceleration deciding means that the deceleration of the vehicle input from the external device exceeds the previously stored predetermined deceleration, to an integral value calculated by the second integrating means;

a second integral value deciding means for deciding whether or not a value calculated by the adding means exceeds a second predetermined threshold value; and a start signal outputting means for outputting a start signal for the first inflator when it has been decided by the first integral value deciding means that the value calculated by the first integrating means exceeds the first predetermined threshold value, and outputting a start signal for the second inflator when it has been decided by the second integral value deciding means that the value calculated by the adding means exceeds the second predetermined threshold value.

The start controlling system for the passenger protection system having such configuration enables the start controlling method for the passenger protection system to control start of the passenger protection system. Respective means can be implemented by executing the predetermined program by the CPU, for example.

In order to achieve the object of the present invention, according to a third aspect of the present invention, there is provided a start controlling system for a passenger protection system, for controlling start of the passenger protection system which has a first inflator and a second inflator and is constructed such that a protection system for protecting passengers of a vehicle is started by firing the first inflator and the second inflator respectively in response to a start signal from an external device, the system comprising:

a central processing unit, based on a predetermined program loaded from an external device,
for executing time integration with respect to an externally input deceleration of a vehicle,
deciding whether or not a time integral value exceeds a first predetermined threshold value, and then outputting a start signal for the first inflator if it has been decided that the time integral value exceeds the first predetermined threshold value,
comparing a detected deceleration of the vehicle with a previously stored predetermined deceleration for a first predetermined time after the first inflator has been started, then deciding whether or not the detected deceleration of the vehicle exceeds the previously stored predetermined deceleration to increase speed reduction, and then executing time integration over an area, in which the detected deceleration of the vehicle exceeds the previously stored predetermined deceleration, for a second predetermined time thereafter if it has been decided that the detected deceleration of the vehicle exceeds the previously stored predetermined deceleration to increase the speed reduction,
adding the time integral value to a speed integral value which is calculated as time integration of the detected deceleration of the vehicle until a point of time when it has been decided that the detected deceleration of the vehicle exceeds the previously stored predetermined deceleration to increase the speed reduction, and
deciding whether or not an added result exceeds a second predetermined threshold value, and then outputting a start signal for the second inflator if it has been decided that the added result exceeds the second predetermined threshold value;

a memory device for storing the program, which is executed by the central processing unit, to be readable by the central processing unit;

a D/A converter for converting a digital start signal, which is supplied from the central processing unit to the first inflator and the second inflator, into an analog signal; and an interface circuit for converting an output signal of the D/A converter into predetermined signals which are suitable for the first inflator, and the second inflator respectively.

In order to achieve the object of the present invention, according to a fourth aspect of the present invention, there is provided a start controlling method for a passenger protection system, for controlling start of the passenger protection system which has a first inflator and a second inflator and is constructed such that a protection system for protecting passengers of a vehicle is started by firing the first inflator and the second inflator respectively in response to a start signal from an external device, the method comprising the steps of:

detecting a deceleration of a vehicle;

calculating a speed integral value which is time integration of the deceleration;

deciding whether or not the speed integral value exceeds a predetermined threshold value defined according to a detected deceleration of the vehicle;

starting the first inflator if it has been decided that the speed integral value exceeds the predetermined threshold value defined according to the detected deceleration of the vehicle;

comparing the detected deceleration of the vehicle with a previously stored predetermined deceleration for a predetermined time after the first inflator has been started, then deciding whether or not the detected deceleration of the vehicle exceeds the previously stored predetermined deceleration to increase speed reduction;

holding a threshold value defined according to the deceleration until termination of the predetermined time thereafter if it has been decided that the detected deceleration of the vehicle exceeds the previously stored predetermined deceleration to increase the speed reduction, and then deciding whether or not the speed integral value exceeds the predetermined threshold value being held for that time duration; and starting the second inflator if it has been decided that the speed integral value exceeds the predetermined threshold value being held.

Such start controlling method has been made in view of the fact that, if increase of the speed integral value becomes slow, i.e., stagnation of the speed integral value is caused, after the first inflator has been fired but the deceleration in excess of a predetermined value is caused, fire of the second inflator must be needed.

More particularly, in various types of crashes which needs firing of the first inflator but do not need firing of the second inflator, data of change in the deceleration caused when the deceleration is increased up to its maximum (in other words, the acceleration is increased to the negative side) are collected previously according to the experiment, etc., and stored, and then the detected deceleration of the vehicle is compared with the stored deceleration after the first inflator has been fired. Then, if the detected deceleration of the vehicle exceeds the stored deceleration to increase speed reduction, the threshold value defined according to the deceleration of the vehicle at that time is held for a predetermined time thereafter. Since the deceleration of the vehicle which exceeds this threshold value being held can be detected if the crash needs firing of the second inflator, start of the second inflator is executed when it is decided that the deceleration of the vehicle exceeds the threshold value. As a result, even if the stagnation of the speed integral value is caused, the second inflator can be fired without fail.

In order to achieve the object of the present invention, according to a fifth aspect of the present invention, there is provided a start controlling system for a passenger protection system, for controlling start of the passenger protection system which has a first inflator and a second inflator and is constructed such that a protection system for protecting passengers of a vehicle is started by firing the first inflator and the second inflator respectively in response to a start signal from an external device, the system comprising:

an integrating means for executing time integration with respect to a deceleration of a vehicle input from an external device;

a first integral value deciding means for deciding whether or not a value calculated by the integrating means exceeds a predetermined threshold value defined according to the deceleration of the vehicle;

an acceleration deciding means for deciding whether or not the deceleration of the vehicle input from the external device exceeds a previously stored predetermined deceleration to increase speed reduction, for a predetermined time after a point of time when it is decided by the first integral value deciding means that the value calculated by the integrating means exceeds the predetermined threshold value defined according to the deceleration of the vehicle;

a second integrating means for holding a threshold value defined according to the deceleration of the vehicle until termination of the predetermined time when it has been decided by the acceleration deciding means that the deceleration of the vehicle input from the external device exceeds the previously stored predetermined deceleration to increase the speed reduction, and then deciding whether or not a value calculated by the integrating means exceeds the predetermined threshold value being held for this time duration; and a start signal outputting means for outputting a start signal for the first inflator when it has been decided by the first integral value deciding means that the value calculated by the first integrating means exceeds the first predetermined threshold value, and outputting a start signal for the second inflator when it has been decided by the second integral value deciding means that the value calculated by the integrating means exceeds the predetermined threshold value being held.

The start controlling system for the passenger protection system having such configuration enables the start controlling method for the passenger protection system to control start of the passenger protection system. Respective means can be implemented by executing the predetermined program by the CPU, for example.

In order to achieve the object of the present invention, according to a sixth aspect of the present invention, there is provided a start controlling system for a passenger protection system, for controlling start of the passenger protection system which has a first inflator and a second inflator and is constructed such that a protection system for protecting passengers of a vehicle is started by firing the first inflator and the second inflator respectively in response to a start signal from an external device, the system comprising:

a central processing unit, based on a predetermined program loaded from an external device,
for executing time integration with respect to an externally input deceleration of a vehicle,
deciding whether or not a time integral value exceeds a predetermined threshold value defined according to the externally input deceleration of the vehicle,
outputting a start signal for the first inflator if it has been decided that the time integral value exceeds a predetermined threshold value defined according to a detected deceleration of the vehicle, comparing the detected deceleration of the vehicle with a previously stored predetermined deceleration for a predetermined time after the first inflator has been started, then deciding whether or not the detected deceleration of the vehicle exceeds a previously stored predetermined deceleration to increase speed reduction, holding a threshold value defined according to the deceleration if it has been decided that the detected deceleration of the vehicle exceeds the previously stored predetermined deceleration to increase the speed reduction, and then deciding whether or not the speed integral value exceeds the predetermined threshold value being held for this time duration, outputing a start signal for the second inflator if it has been decided that the speed integral value exceeds the predetermined threshold value being held;

a memory device for storing the program, which is executed by the central processing unit, to be readable by the central processing unit;

a D/A converter for converting a digital start signal, which is supplied from the central processing unit to the first inflator and the second inflator, into an analog signal; and an interface circuit for converting an output signal of the D/A converter into predetermined signals which are suitable for the first inflator and the second inflator respectively.

In order to achieve the object of the present invention, according to a seventh aspect of the present invention, there is provided a recording medium for recording a plurality of computer-readable instructions, comprising:

a first instruction means for causing a computer to execute time integration with respect to a deceleration of a vehicle input from an external device;

a second instruction means for causing the computer to decide whether or not a time integral value exceeds a first predetermined threshold value;

a third instruction means for causing the computer to output a start signal for the first inflator if it is decided that the time integral value exceeds the first predetermined threshold value;

a fourth instruction means for causing the computer to decide whether or not the deceleration of the vehicle exceeds a previously stored predetermined deceleration, for a first predetermined time after the start signal has been output to the first inflator;

a fifth instruction means for causing the computer to execute time integration over an area, in which the deceleration of the vehicle exceeds the previously stored predetermined deceleration, for a second predetermined time thereafter if it is decided that the deceleration of the vehicle exceeds the previously stored predetermined deceleration;

a sixth instruction means for causing the computer to execute an addition calculation of the calculated time integral value and the time integral value of the deceleration of the vehicle, which is calculated until a point of time when it is decided that the deceleration of the vehicle exceeds the previously stored predetermined deceleration;

a seventh instruction means for causing the computer to decide whether or not a result of the addition calculation exceeds a second predetermined threshold value; and an eighth instruction means for causing the computer to output a start signal for the second inflator if it is decided that the result of the addition calculation exceeds the second predetermined threshold value.

Such recording medium is fit to cause the computer to execute the method according to the invention.

In order to achieve the object of the present invention, according to an eighth aspect of the present invention, there is provided a recording medium for recording a plurality of computer-readable instructions, comprising:

a first instruction means for causing a computer to execute calculation of a time integration value with respect to a deceleration of a vehicle input from an external device;

a second instruction means for causing the computer to decide whether or not the time integral value exceeds a predetermined threshold value defined according to a detected deceleration of the vehicle;

a third instruction means for causing the computer to output a start signal for the first inflator if it is decided that the time integral value exceeds the predetermined threshold value;

a fourth instruction means for causing the computer to decide whether or not a detected deceleration of the vehicle exceeds a previously stored predetermined deceleration to increase speed reduction, for a predetermined time after the first inflator has been started;

a fifth instruction means for causing the computer to hold a threshold value defined according to the deceleration of the vehicle until termination of the predetermined time if it is decided that the detected deceleration of the vehicle exceeds the previously stored predetermined deceleration to increase the speed reduction, and then causing the computer to decide whether or not the time integral value of the deceleration of the vehicle exceeds the predetermined threshold value being held; and a sixth instruction means for causing the computer to output a start signal for the second inflator if it is decided that the time integral value of the deceleration of the vehicle exceeds the predetermined threshold value being held.

Such recording medium is fit to cause the computer to execute the method according to the invention.

DETAILED DESCRIPTION OF THE PREFERRED EMBODIMENTS

Embodiments of the present invention will be explained in detail with reference to the accompanying drawings hereinafter.

Members, arrangements, etc., described hereinafter should not be interpreted not to limit the present invention and they may be variously modified and changed within the scope and spirit of the present invention.

First, a basic configuration of a start controlling system for a passenger protection system according to embodiments of the present invention (referred to as "present system" hereinafter) will be explained with reference to FIG. 1.

Figure 1:
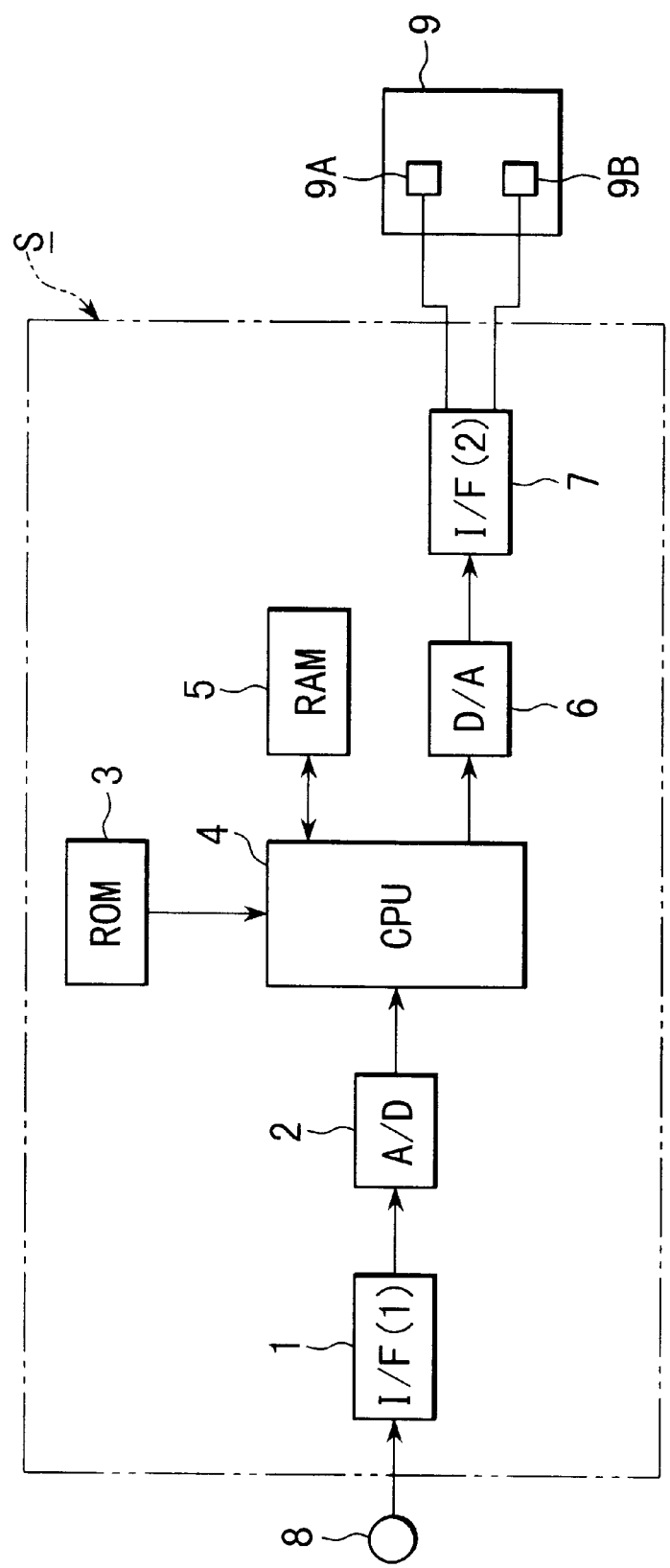
FIG. 1 is a schematic view showing an example of a configuration of a start controlling system for a passenger protection system according to embodiments of the present invention.

As shown in FIG. 1, a so-called hardware configuration of the present system S comprises a first interface circuit (labeled as "I/F (1)" in FIG. 1) 1, an analog/digital converter (labeled as "A/D" in FIG. 1) 2, a ROM (Read Only Memory) 3, a central processing unit (labeled as "CPU" in FIG. 1) 4, a RAM (Random Access Memory) 5, a digital/analog converter (labeled as "D/A" in FIG. 1) 6, and a second interface circuit (labeled as "I/F (2)" in FIG. 1) 7.

The first interface circuit 1 converts a level of an analog output signal from an acceleration sensor 8 which detects an acceleration of a vehicle. The analog output signal is converted into a digital signal by the analog/digital converter 2, which has a well known circuit configuration, and then input into the central processing unit 4.

In this case, as the so-called acceleration sensor which is well known, there are semiconductor type sensors, piezoelectric type sensors, etc. But the acceleration sensor 8 in the present system S must not be limited to a particular type sensor, and therefore any type sensor may be employed.

The ROM 3 readably stores a program for implementing start controlling operations described later, various data such as constants, etc. The ROM 3 consists of a memory which is formed as a well known integrated circuit.

The central processing unit 4 executes start control described later when the program for start control of the passenger protection system is loaded into the CPU 4. For example, the CPU 4 consists of a well known CPU being formed as a so-called IC, and carries out start control described later when the program for start control of the passenger protection system is loaded thereinto. In place of this CPU 4, other integrated circuits, e.g. a DSP (Digital Signal Processor), which is known as an integrated circuit to enable the high speed arithmetic process, etc., may be employed if they can achieve equivalent functions to those of the CPU 4.

The RAM 5 is a memory device which is formed as well known the integrated circuit like the ROM 3. The results of arithmetic operations executed by the CPU 4, etc., can be stored/read into/from the RAM 5.

The digital/analog converter 6 converts a digital start signal, which is output from the CPU 4 to a first inflator 9A and a second inflator 9B, into an analog start signal. The digital/analog converter 6 has a well known circuit configuration.

The second interface circuit 7 converts control signals being output from the CPU 4 via the digital/analog converter 6, i.e. a start signal for starting the first inflator 9A and a start signal for starting the second inflator 9B, into a signal level and a signal format which are fit to be input into the first inflator 9A and the second inflator 9B respectively, and then outputs converted control signals.

The air bag system 9 comprises the first inflator (gas generator) 9A and the second inflator (gas generator) 9B. As described later, in this two-stage air bag system 9, at first the first stage inflator 9A is started under predetermined conditions to thus generate a gas until an air bag main body (not shown) is inflated up to an appropriate size, and then the second stage inflator 9B is started to generate the gas similarly until the air bag main body is inflated up to its maximum size.

Next, prior to the explanation of procedures of particular start control effected by the CPU 4, a basic concept of start control in the first embodiment of the present invention will be explained with reference to FIGS. 4 and 5.

Start control in the first embodiment intends to prevent such a situation that increase in the speed integral value $\Delta V$ which is the integral value of the so-called deceleration becomes small (in other words, an absolute value of a change rate of the speed integral value $\Delta V$ is reduced), i.e., a so-called stagnation state is generated after the first stage inflator 9A has been started, and therefore the second stage inflator 9B cannot be appropriately started since it is not decided that start of the second stage inflator 9B is requested because of such stagnation of the speed integral value $\Delta V$ although essentially start of the second stage inflator 9B is requested.

More particularly, according to the type of the crash, sometimes there are cases where fire of the first stage inflator 9A is requested but fire of the second stage inflator 9B is not requested. In start control in the first embodiment, in various changes in characteristic curves of various decelerations G caused in such cases where fire of the first stage inflator 9A is requested but fire of the second stage inflator 9B is not requested, at first data are collected in the case where the change in the deceleration G is maximized to the negative side, and then a value of the deceleration G is stored as $G_M$ over a predetermined period of time.

It is preferable that this data collection should be effected based on the experiment, simulation by the computer, etc. Also, it is preferable that data of $G_M$ should be stored in the ROM 3, for example.

Figure 4:
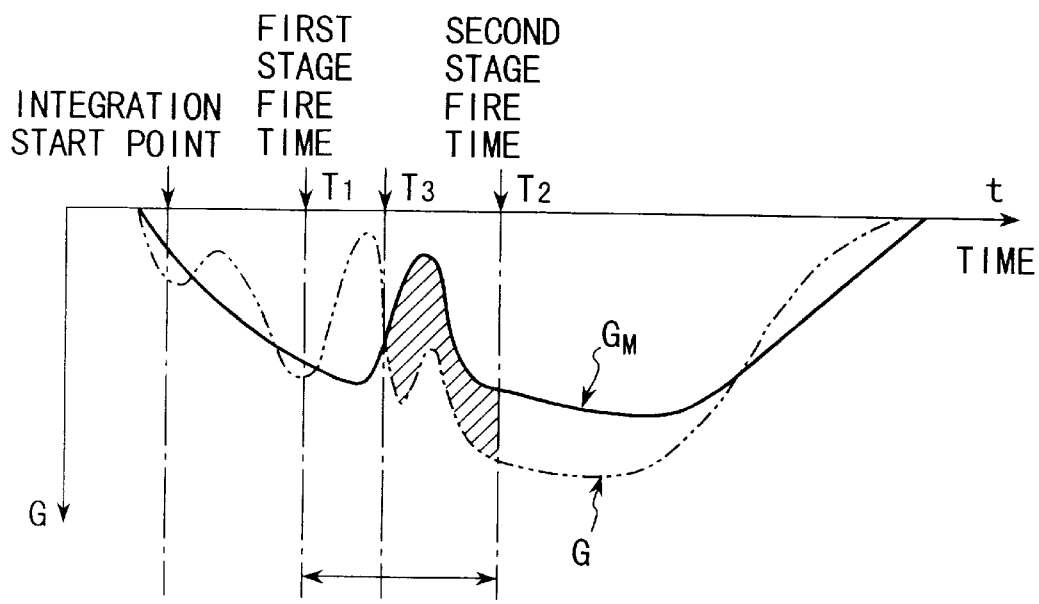
FIG. 4 is a characteristic diagram showing an example of change in characteristic curves of stored deceleration $G_M$ and deceleration G which needs fire of a second inflator even when stagnation of a speed integral value is caused after a first inflator has been fired, in the first embodiment of the present invention.

In FIG. 4, an example of a characteristic curve is indicated by a solid line when the change in the deceleration G is maximized to the negative side, in various changes in characteristic curves of various decelerations G caused in such cases where fire of the first stage inflator 9A is requested but fire of the second stage inflator 9B is not requested.

More particularly, in the case of this characteristic curve, the deceleration G is increased relatively smoothly (in other words, increased to the negative side) with the lapse of time until it is passed through a first stage fire time T1 of the first stage inflator 9A. Then, the deceleration G is reduced rapidly (in other words, directed toward the positive side) from a point of time slightly before the intermediate point between the first stage fire time T1 of the first stage inflator 9A and a second stage fire time T2 of the second stage inflator 9B.

Then, after the deceleration G has been reduced to some extent, it is increased rapidly for the second time. Then, such second rapid increase of the deceleration G becomes gentle from a point of time a little before the second stage fire time T2 of the second stage inflator 9B (see the characteristic curve indicated by the solid line in FIG. 4).

Figure 5:
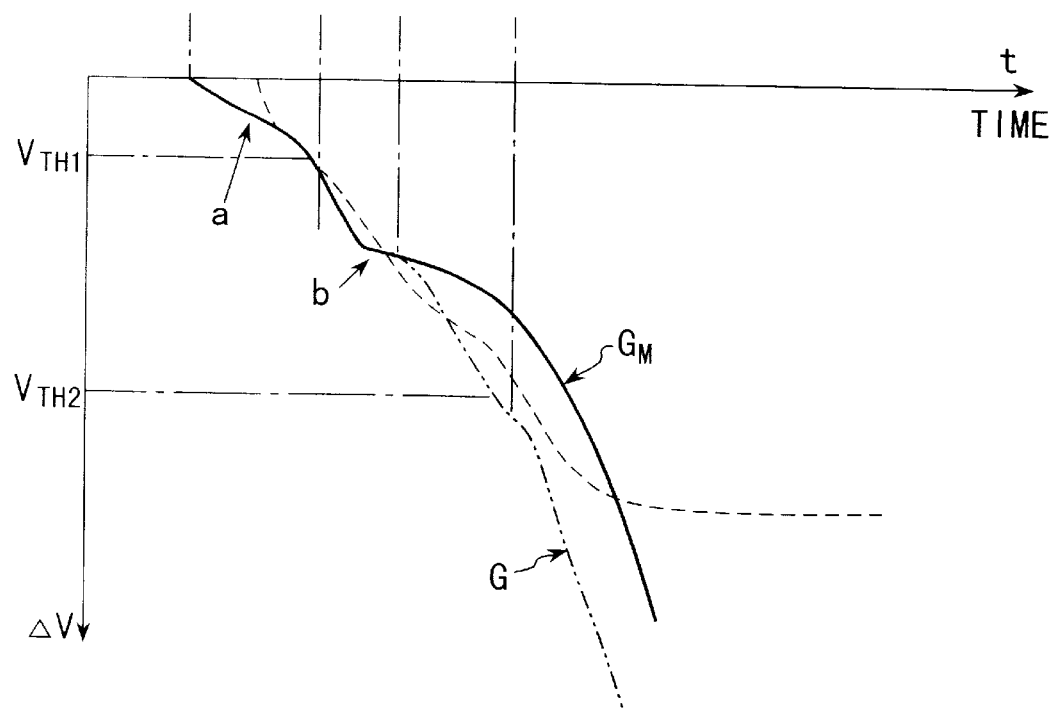
FIG. 5 is a characteristic diagram showing change in characteristic curves of the speed integral value relative to the deceleration $G_M$ and the deceleration G shown in FIG. 4.

In FIG. 5, the speed integral value $\Delta V$ which is the time integration of the deceleration G is given by the characteristic curve being indicated by the broken line.

More particularly, in this case, the speed integral value $\Delta V$ exceeds a predetermined threshold value $V_{TH1}$ before the first stage fire time T1 of the first stage inflator 9A, and is increased up to the second stage fire time T2 of the second stage inflator 9B with change in the deceleration G. Then, increase in the speed integral value $\Delta V$, i.e. an absolute value of the change rate, is reduced gradually near the second stage fire time T2, and then the speed integral value $\Delta V$ exceeds a predetermined threshold value $V_{TH2}$ at last when it passes through the second stage fire time T2. It is decided that fire of the second stage inflator 9B is needed when the speed integral value $\Delta V$ exceeds the predetermined threshold value $V_{TH2}$ (see the characteristic curve indicated by the broken line in FIG. 5).

Out of the above changes in the deceleration collected by the experiment, etc., data collected between the first stage fire time T1 of the first stage inflator 9A and the desired second stage fire time T2 of the second stage inflator 9B are stored in the ROM 3 (see FIG. 4).

According to this start control, after the first stage inflator 9A has been fired, the detected deceleration G and the stored deceleration $G_M$ are compared with each other at an appropriate time interval, and then time interval of difference between the deceleration G and the deceleration $G_M$ is calculated from a point of time when the detected deceleration G is increased larger than the stored deceleration $G_M$ (the deceleration G exceeds the deceleration $G_M$ toward the negative side) to the desired second stage fire time T2 of the second stage inflator 9B. Then, the time integral value is added to the speed integral value $\Delta V$ which is the time integral value of the deceleration G calculated until the previous first stage fire time T1 of the first stage inflator 9A. If such added value exceeds the predetermined threshold value $V_{TH2}$, the second stage inflator 9B is started.

For instance, an example of change in characteristic curves of the deceleration G in the case where fire of both the first stage inflator 9A and the second stage inflator 9B is requested is indicated by a chain double-dashed line in FIG. 4.

In the case of this example of change in characteristic curves of the deceleration G being indicated by the chain double-dashed line, the deceleration G is increased at first to some extent (increased to the negative side), then is immediately turn to decrease, and then starts to increase again. Then, the deceleration G comes up to a peak on the negative side at a point of time near the first stage fire time T1 of the first stage inflator 9A, and then is reduced once again until a point of time before the almost middle between the first stage fire time T1 of the first stage inflator 9A and the desired second stage fire time T2 of the second stage inflator 9B (see FIG. 4). Where "the desired second stage fire time T2" means a point of time which can be expanded at its maximum as the fire time of the second stage inflator 9B with respect to the proper passenger protection after the first stage inflator 9A has been fired. The desired second stage fire time T2 has a meaning that, if the second stage inflator 9B is fired after this second stage fire time T2, there is a possibility that proper protection of the passenger cannot be achieved.

Then, the deceleration G is increased abruptly once again, then comes up to a peak on the negative side around the almost middle between the first stage fire time T1 of the first stage inflator 9A and the desired second stage fire time T2 of the second stage inflator 9B, then is directed to decrease three times, and then is increased rapidly three times when it is decreased to some extent (see FIG. 4). This increase in the deceleration G for the third time becomes gentle from a point of time before the desired second stage fire time T2 of the second stage inflator 9B.

Such speed integral value $\Delta V$ of the deceleration G, if calculated, may be indicated by the characteristic curve indicated by the solid line in FIG. 5.

More particularly, the speed integral value $\Delta V$ is increased (i.e., increased to the negative side) with the increase in the deceleration G until reduction in the deceleration G is generated for the first time, and then so-called stagnation of integration is caused (see near a reference a in FIG. 5) after the first reduction in the deceleration G has been caused. Then, such stagnation state can be solved to thus increase the speed integral value $\Delta V$ with the increase in the deceleration G, and then exceed the predetermined threshold value $V_{TH1}$.

However, with the second reduction in the deceleration G after this, stagnation of the integral value is caused once again before the desired second stage fire time T2 of the second stage inflator 9B (see a location indicated by a reference b in FIG. 5). Therefore, the speed integral value $\Delta V$ has not yet exceeded the predetermined threshold value $V_{TH2}$, which indicates the need of fire of the second stage inflator 9B, at the desired second stage fire time T2, but the speed integral value $\Delta V$ exceeds the predetermined threshold value $V_{TH2}$ after it has passed through the desired second stage fire time T2 (see the characteristic curve indicated by the solid line in FIG. 5).

Therefore, in this start control, after the first stage inflator 9A has been fired, the time integration as to a portion where the deceleration G exceeds the deceleration $G_M$, i.e. the integral value corresponding to an area of the hatched portion (such integral value is referred to as a "temporary integral value $\Delta V\text{temp}$" hereinafter) in the example in FIG. 4, is added to the speed integral value $\Delta V$ which is derived until the deceleration G exceeds the deceleration $G_M$ (see a point of time T3 in FIG. 4), and then the result is set as the speed integral value $\Delta V$. According to such process, as shown by the characteristic curve being indicated by the chain double-dashed line, the speed integral value $\Delta V$ can exceed sufficiently the predetermined threshold value $V_{TH2}$ at the desired second stage fire time T2 of the second stage inflator 9B without stagnation after the deceleration G has exceeded the deceleration $G_M$, so that the second stage inflator 9B can be fired without fail.

Next, detailed procedures of start control of the passenger protection system according to the first embodiment of the present invention will be explained with reference to a flowchart shown in FIG. 2 hereunder.

Figure 2:
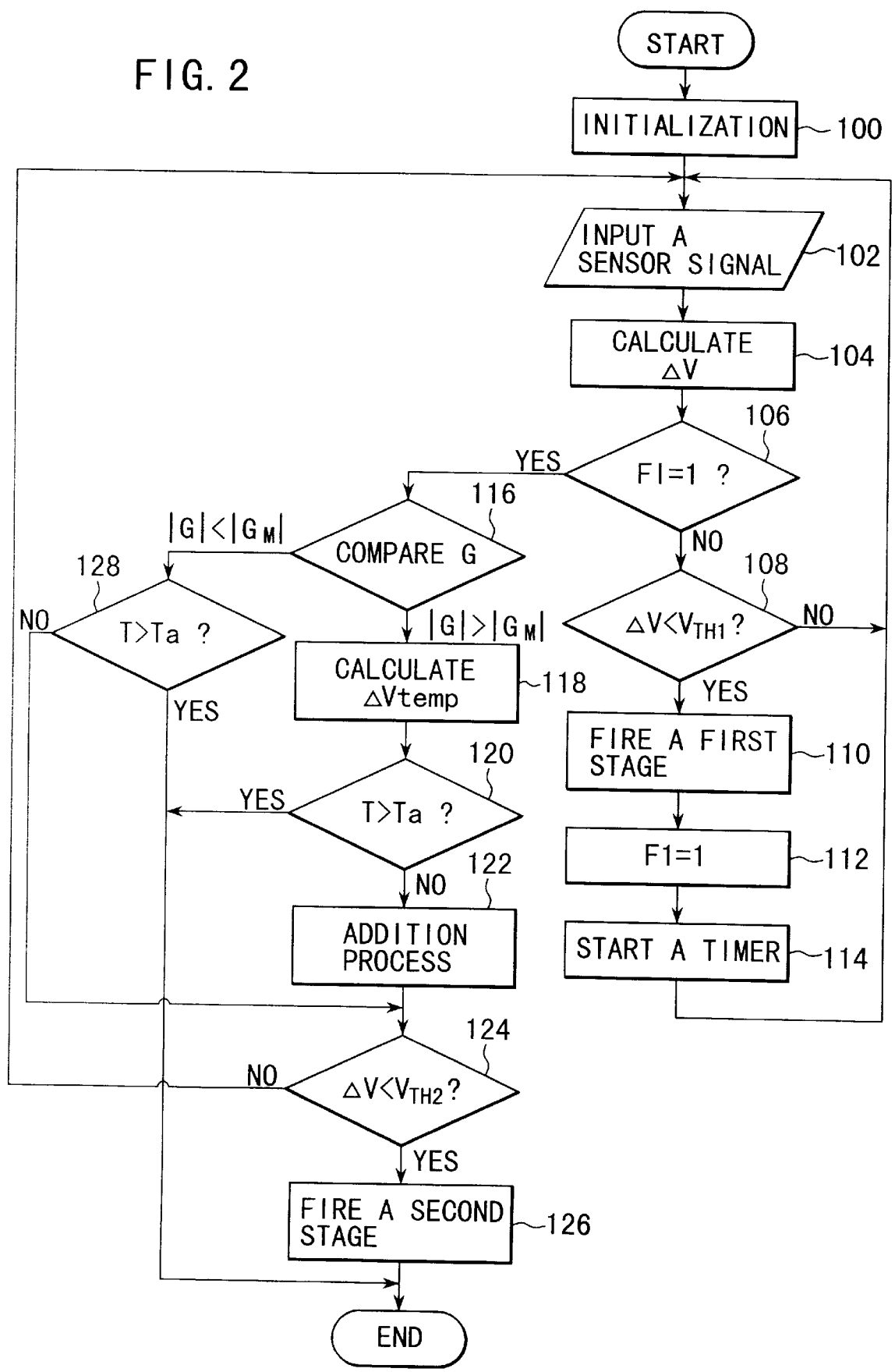
FIG. 2 is a flowchart showing procedures of start control of the passenger protection system according to a first embodiment of the present invention.

If an operation of the CPU 4 is commenced, initialization of various variables, etc., is first executed (see step 100 in FIG. 2). Then, the deceleration G detected by an acceleration sensor 8 is input into the CPU 4 via the first interface circuit 1 and the analog/digital converter 2 (see step 102 in FIG. 2).

Time integration of the deceleration G loaded into the CPU 4 is then executed to calculate the speed integral value $\Delta V$ (see step 104 in FIG. 2).

The process then advances to step 106 wherein it is decided whether or not a state decision flag F1 is set to "1" (see step 106 in FIG. 2).

As described later, the state decision flag F1 is set to "1" immediately after the first stage inflator 9A has been started, and conversely is set to "0" when it has been decided that start of the second stage inflator 9B is not needed. The state "1" means that the state decision flag F1 is in a state to decide whether or not start of the second stage inflator 9B is requested.

In step 106, if it has been decided that F1=1 (if YES), the process goes to step 116 described later. In contrast, in step 106, if it has been decided that F1≠1 (if NO), then it is decided whether or not the speed integral value ΔV exceeds the predetermined threshold value $V_{TH1}$ to take a value on the more negative side (see step 108 in FIG. 2).

Then, if it has been decided that the speed integral value ΔV does not exceed the predetermined threshold value $V_{TH1}$ to take the value on the more negative side (i.e., ΔV<$V_{TH1}$ has not been satisfied yet) (if NO), it is decided that the speed integral value ΔV is not in such a state that is decided as generation of the clash, and then the process returns to previous step 102. Then, a series of processes are repeated once again.

Here the predetermined threshold value $V_{TH1}$ shows the magnitude of the speed integral value when it is decided that the first stage inflator 9A is started (see FIG. 5). This threshold value $V_{TH1}$ is calculated by using a preset relation based on the magnitude of the deceleration G at this point of time, otherwise is calculated by using a previously stored conversion table which stipulates a relation between the deceleration G and the threshold value $V_{TH1}$. Then, the calculated threshold value $V_{TH1}$ is set. This method of setting the threshold value $V_{TH1}$ is similar to the prior art.

A particular relation between the deceleration G and the threshold value $V_{TH1}$ is omitted herein. Roughly speaking, a level of the deceleration G at which the first stage inflator 9A is to be fired in the frontal crash, for example, is calculated from simulation data derived by the experiment or the computer, and then this relation is set based on the level of the deceleration G. With regard to the fact that the deceleration G is caused differently according to the vehicle type, an appropriate relation between the deceleration G and the threshold value $V_{TH1}$ can be set every vehicle type.

On the contrary, if it has been decided that ΔV<$V_{TH1}$ is satisfied (if YES), i.e., it has been decided that the first stage inflator 9A must be fired, the start signal is then output from the CPU 4 to the first stage inflator 9A via the D/A converter 6 and the second interface circuit 7. Then, the first stage inflator 9A is fired (see step 110 in FIG. 2).

Next, when the first stage inflator 9A is fired, the state decision flag F1 is set to "1" (see step 112 in FIG. 2). Then, a timer is started and then the process returns to previous step 102 (see step 114 in FIG. 2). This timer is used for time count, and is constructed to count a lapse time from start of the timer according to the well known software.

In contrast, it has been decided that F1=1 in step 106, the process proceeds to step 116. In step 116, it is decided whether or not the deceleration G which has been loaded into the CPU 4 by the process in previous step 102 exceeds the deceleration $G_M$ being stored previously in the ROM 3 (see step 116 in FIG. 2).

In this case, as has been explained previously with reference to FIGS. 4 and 5, the deceleration $G_M$ denotes data of the deceleration which are collected based on the experiment, the simulation by using the computer, etc., and ranges between the first stage fire time T1 of the first stage inflator 9A and the desired second stage fire time T2 of the second stage inflator 9B. Where the desired second stage fire time T2 of the second stage inflator 9B is set at a point of time after the first stage fire time T1 of the first stage inflator 9A by about 20 msec, for example.

If the decelerations $G_M$ are stored into the ROM 3, they give discrete data of the deceleration which are taken at a predetermined time interval for a lapse time from the first stage fire time T1 of the first stage inflator 9A as a starting point.

Accordingly, it is preferable that the time interval at which the decelerations G are loaded by the acceleration sensor 8 should be set to be identical to the time interval of the data of the decelerations $G_M$ stored into the ROM 3. If respective time intervals are different, the decelerations $G_M$ may be decided at concerned points of time by the well known interpolation process.

In step 116, if it has been decided that |G|<|$G_M$| (stored data $G_M$ is increased to the negative side much more than the deceleration G being detected by the acceleration sensor 8), it is decided that the crash is not in the condition wherein fire of the second stage inflator 9B is requested. Then, the process goes to step 128. Instep 128, it is decided whether or not the lapse time from the first stage fire time T1 of the first stage inflator 9A exceeds a predetermined period of time Ta.

If it has been decided that the lapse time T exceeds the predetermined period of time Ta (if YES), it is decided that the crash has not come up to the extent that fire of the second stage inflator 9B must be requested, and then the process is ended (see step 128 in FIG. 2). Conversely, if it has been decided that the lapse time T does not exceed the predetermined period of time Ta (if NO), the process advances to step 124 (see step 128 in FIG. 2).

In this case, the predetermined period of time Ta is a time interval between the first stage fire time T1 of the first stage inflator 9A and the desired second stage fire time T2 of the second stage inflator 9B.

On the contrary, in previous step 116, if it has been decided that |G|>|$G_M$| (the deceleration G being detected by the acceleration sensor 8 exceeds stored data $G_M$ much more to the negative side) (in other words, the deceleration of the vehicle exceeds a predetermined deceleration to thus increase the speed reduction much more), time integration of difference between the deceleration G and the deceleration $G_M$ is executed to calculate the temporary (time) integral value ΔVtemp (see step 118 in FIG. 2). That is to say, as has been explained with reference to FIGS. 4 and 5 previously, assume that the stored data $G_M$ is given by the characteristic curve indicated by the solid line in FIG. 4 and the deceleration G detected by the acceleration sensor 8 is given by the characteristic curve indicated by the chain double-dashed line in FIG. 4, calculation of the temporary integral value ΔVtemp corresponds to calculation of an area of a portion surrounded by above two characteristic curves (a hatched area in FIG. 4). In other words, as for an area in which the detected deceleration G exceeds the stored data $G_M$ to increase to the negative side, time integration is executed.

After the above temporary integral value ΔVtemp has been calculated, it is decided whether or not the lapse time T from the first stage fire time T1 of the first stage inflator 9A exceeds the predetermined period of time Ta (see step 120 in FIG. 2). If it has been decided that the lapse time T exceeds the predetermined period of time Ta (if YES), the process is then terminated.

In contrast, if it has been decided that the lapse time T does not exceed the predetermined period of time Ta (if NO), the process is conducted in which the speed integral value $\Delta V$ (see step 104 in FIG. 2) calculated until it has been decided that $|G|>|G_M|$ (see step 116 in FIG. 2) is added to the above temporary integral value $\Delta V$temp. Then, the added result is set to the new speed integral value $\Delta V$ (see step 122 in FIG. 2).

Then, it is decided whether or not the speed integral value $\Delta V$ calculated in step 122 exceeds the predetermined threshold value $V_{TH2}$ to extend to the negative side ($\Delta V<V_{TH2}$) (see step 124 in FIG. 2). Where the predetermined threshold value $V_{TH2}$ is determined in compliance with the experiment, the simulation by the computer, etc. More particularly, according to the experiment, etc., the temporary integral value $\Delta V$temp is calculated as above and also the value added to the speed integral value $\Delta V$ is calculated, and then the predetermined threshold value $V_{TH2}$ is selected among such data and set as the value which is suitable for the decision of fire of the second stage inflator 9B.

In step 124, if it has been decided that $\Delta V<V_{TH2}$ is satisfied (If YES), i.e. if It has been decided that the crash is in the state where fire of the second stage inflator 9B is requested, the start signal is output from the CPU 4 to the second stage Inflator 9B via the D/A converter 6 and the second interface circuit 7 and then the second stage Inflator 9B is fired (see step 126 in FIG. 2).

On the other hand, in step 124, if it has been decided that $\Delta V<V_{TH2}$ is not satisfied (if NO), i.e. if it has been decided that there is no need to fire the second stage inflator 9B, the process returns to step 102. Then, a series of processes are repeated newly.

In the above first embodiment, a first integrating means can be implemented by carrying out step 104 by the CPU 4, a first integral value deciding means can be implemented by carrying out step 108 by the CPU 4, an acceleration deciding means can be implemented by carrying out step 116 by the CPU 4, a second integrating means can be implemented by carrying out steps 114, 118, 120 by the CPU 4, an adding means can be implemented by carrying out step 122 by the CPU 4, a second integral value deciding means can be implemented by carrying out step 124 by the CPU 4, and a start signal outputting means can be implemented by carrying out steps 110, 126 by the CPU 4.

Next, a second embodiment will be explained with reference to FIGS. 1 and 3 and FIGS. 6 and 7 hereunder.

A so-called hardware configuration of a start control system S of a passenger protection system according to a second embodiment of the present invention is identical to that shown previously in FIG. 1 previously and no particular difference resides between them. Therefore, a detailed explanation thereof is omitted and FIG. 1 will be referred to in the following explanation as the need arises.

To begin with, the second embodiment will be schematically explained while comparing with the above first embodiment. First, in the above first embodiment, the time integration of an area where the deceleration G being detected by the acceleration sensor 8 exceeds the previously stored deceleration $G_M$ to increase to the negative side ($G<G_M$) is calculated, and then the time integral value is added to the speed integral value $\Delta V$ at a point of time when $G<G_M$ is satisfied. Therefore, even if stagnation of the deceleration G is caused after the first stage inflator 9A has been fired, the deceleration G can exceed the predetermined threshold value $V_{TH2}$ to thus ensure the fire of the second stage inflator 9B without fail.

In contrast, in the second embodiment, the threshold value $V_{TH2}$ is held at a point of time when $G<G_M$ is satisfied, and then fire of the second stage inflator 9B is executed when the speed integral value $\Delta V$ exceeds this held threshold value $V_{TH2}$.

Figure 3:
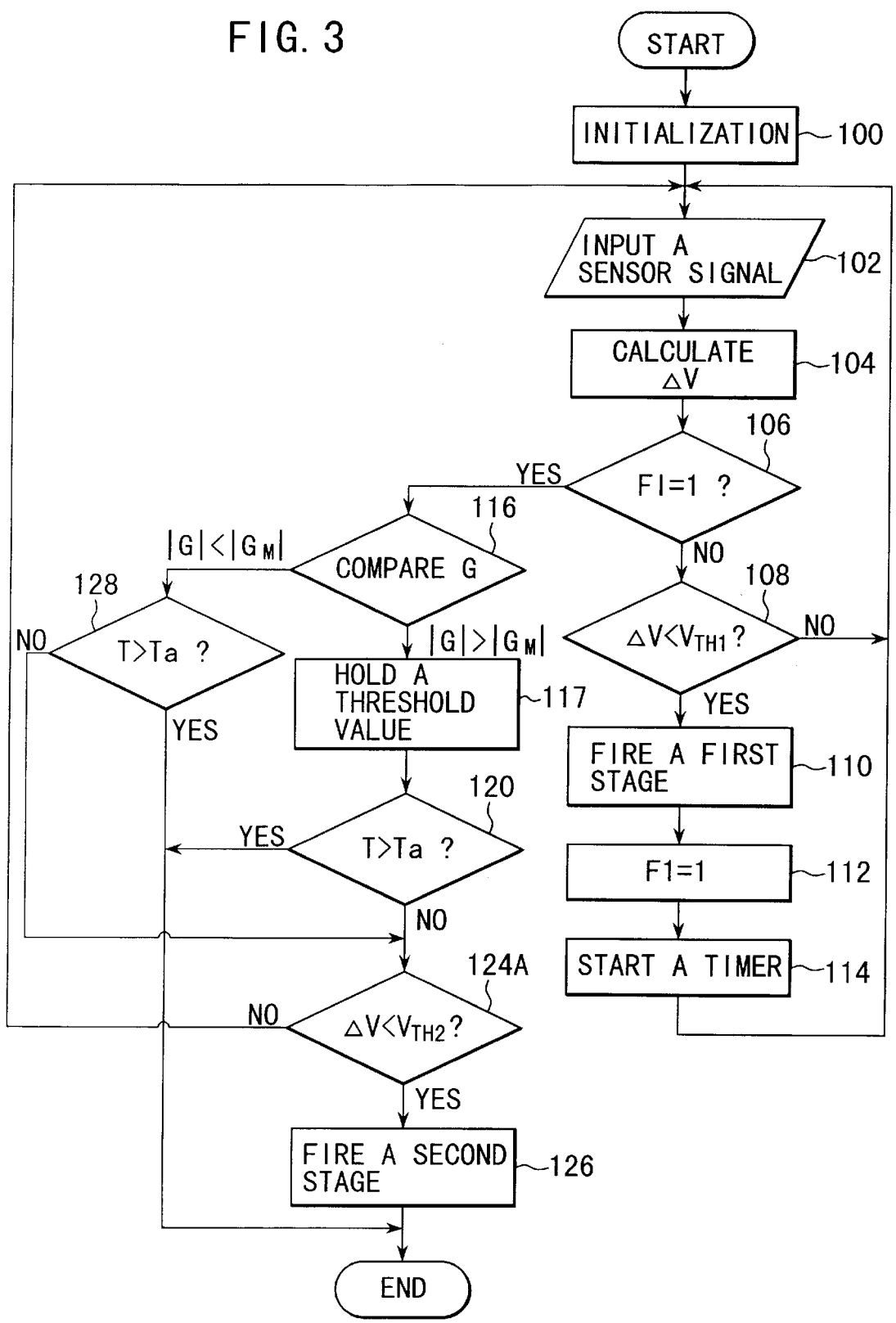
FIG. 3 is a flowchart showing procedures of start control of the passenger protection system according to a second embodiment of the present invention.

Then, detailed procedures of start control will be explained with reference to a flowchart shown in FIG. 3 hereunder. In FIG. 3, the same step numbers as those shown in FIG. 2 are affixed to steps for executing the same processes as those in the flowchart shown in FIG. 2.

When an operation of the CPU 4 is commenced, initialization of various variables, etc., is first executed (see step 100 in FIG. 3). Then, the deceleration G detected by the acceleration sensor 8 is input into the CPU 4 via the first interface circuit 1 and the analog/digital converter 2 (see step 102 in FIG. 3).

Time integration of the deceleration G being loaded into the CPU 4 is then executed to thus calculate the speed integral value $\Delta V$ (see step 104 in FIG. 3).

The process then advances to step 106, and then it is decided whether or not the state decision flag F1 is set to "1" (see step 106 in FIG. 3).

As described later, the state decision flag F1 is set to "1" immediately after the first stage inflator 9A has been started, and conversely is set to "0" when it has been decided that start of the second stage inflator 9B is not needed. The state "1" means that the state decision flag F1 is in a state to decide whether or not start of the second stage inflator 9B is requested.

In step 106, if it has been decided that F1=1 (if YES), then the process goes to step 116 described later. In contrast, in step 106, if it has been decided that F1≠1 (if NO), then it is decided whether or not the speed integral value $\Delta V$ exceeds the predetermined threshold value $V_{TH1}$ to take a value on the more negative side (see step 108 in FIG. 3).

Then, if it has been decided that the speed integral value $\Delta V$ does not exceed the predetermined threshold value $V_{TH1}$ to take the value on the more negative side (i.e., $\Delta V<V_{TH1}$ has not been satisfied yet) (if NO), it is decided that the speed integral value $\Delta V$ is not in such a state that is decided as generation of the crash, and then the process returns to previous step 102. Then, a series of processes are repeated once again.

Here, as described previously in the explanation in step 108 in FIG. 2, the threshold value $V_{TH1}$ is set based on the magnitude of the deceleration G by using a preset relation and a previously stored conversion table.

On the contrary, if it has been decided that $\Delta V<V_{TH1}$ is satisfied (if YES), i.e. it has been decided that the first stage inflator 9A must be fired, the start signal is then output from the CPU 4 to the first stage inflator 9A via the D/A converter 6 and the second interface circuit 7. Then, the first stage inflator 9A is fired (see step 110 in FIG. 3).

Then, when the first stage inflator 9A is fired, the state decision flag F1 is set to "1" (see step 112 in FIG. 3). Then, the timer is started, and then the process returns to previous step 102 (see step 114 in FIG. 3). This timer is used for time count, and is constructed to count a lapse time from start of the timer according to the well known software.

In contrast, in step 106, it has been decided that F1=1, the process proceeds to step 116. In step 116, it is decided whether or not the deceleration G which has been loaded into the CPU 4 by the process in previous step 102 exceeds the deceleration $G_M$ being stored previously in the ROM 3 (see step 116 in FIG. 3).

Figure 6:
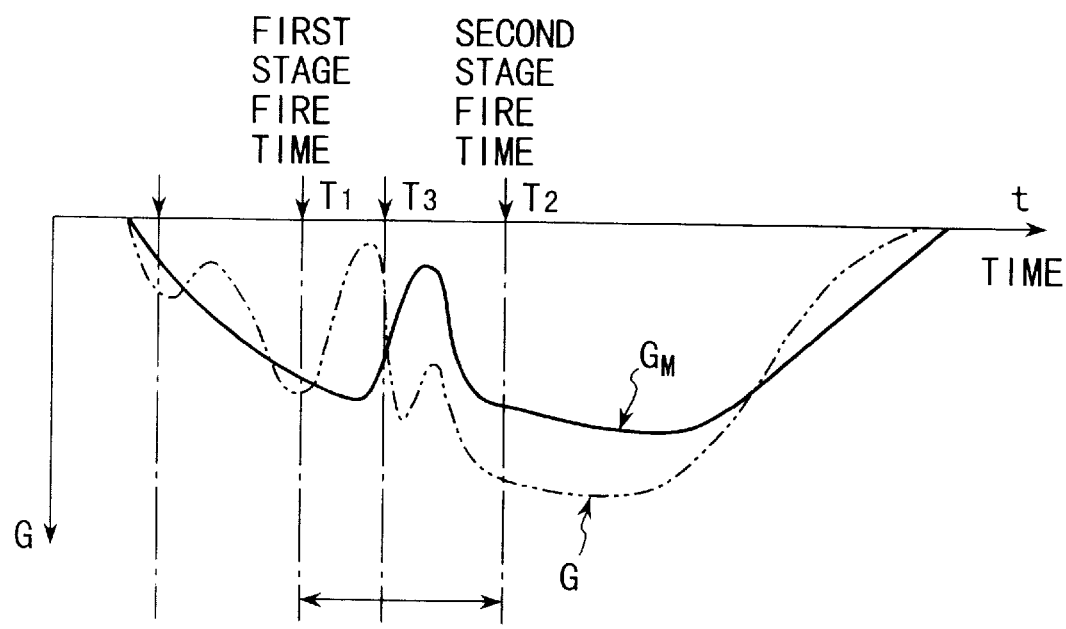
FIG. 6 is a characteristic diagram showing an example of change in characteristic curves of stored deceleration $G_M$ and deceleration G which needs fire of a second inflator even when stagnation of a speed integral value is caused after a first inflator has been fired, in the second embodiment of the present invention.

Here the deceleration $G_M$ will be explained with reference to FIGS. 6 and 7. In this case, FIG. 6 is the same as above FIG. 4. That is, in FIG. 6, the characteristic curve indicated by the solid line corresponds to the case where the deceleration G is maximized (becomes its maximum on the negative side) among changes in characteristic curves of various decelerations G caused when fire of the first stage inflator 9A is needed but fire of the second stage inflator 9B is not needed. In addition, in FIG. 6, the characteristic curve indicated by the chain double-dashed line shows an example of change in characteristic curve of the deceleration G at which both the first stage inflator 9A and the second stage inflator 9B must be fired. In this example, stagnation of the speed integral value ΔV is caused after the first stage inflator 9A has been fired.

Figure 7:
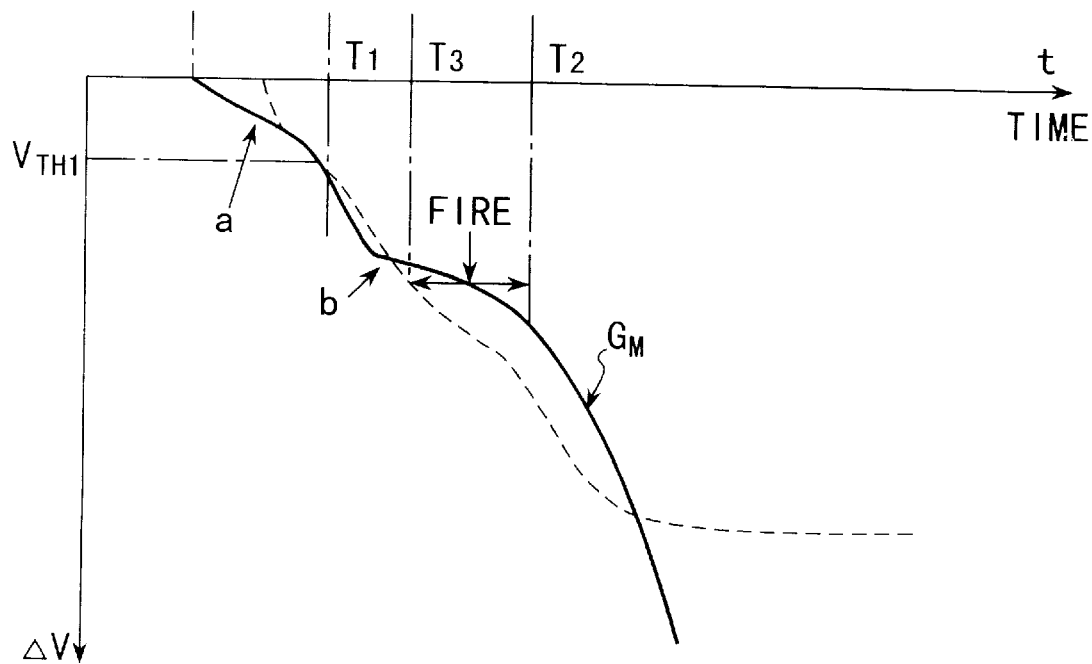
FIG. 7 is a characteristic diagram showing change in characteristic curves of the speed integral value relative to the deceleration $G_M$ and the deceleration G shown in FIG. 6.

FIG. 7 is basically identical to above FIG. 5 except that the characteristic curve indicated by the chain double-dashed line in FIG. 5 is not shown therein. That is, in FIG. 7, the characteristic curve indicated by the broken line corresponds to change in the characteristic curve of the speed integral value ΔV with respect to the deceleration G shown in the characteristic curve indicated by the solid line in FIG. 6. Also, in FIG. 7, the characteristic curve indicated by the solid line corresponds to change in the characteristic curve of the speed integral value ΔV with respect to the deceleration G shown in the characteristic curve indicated by the chain double-dashed line in FIG. 6.

The deceleration $G_M$ stored in the ROM 3 is the same as explained in the first embodiment. In other words, the deceleration $G_M$ is the value of the characteristic curve indicated by the solid line in FIG. 6 between the first stage fire time T1 of the first stage inflator 9A and the desired second stage fire time T2 of the second stage inflator 9B.

In step 116, if it has been decided that $|G|<|G_M|$ (stored data $G_M$ is increased to the negative side much more than the deceleration G being detected by the acceleration sensor 8), it is then decided that the crash is not in the condition wherein fire of the second stage inflator 9B is requested, and then the process goes to step 128. In step 128, it is decided whether or not the lapse time T from the first stage fire time T1 of the first stage inflator 9A exceeds a predetermined period of time Ta.

Then, if it has been decided that the lapse time T exceeds the predetermined period of time Ta (if YES), it is decided that the crash has not come up to such extent that fire of the second stage inflator 9B must be requested, and then the process is ended. Conversely, if it has been decided that the lapse time T does not exceed the predetermined period of time Ta (if NO), the process advances to step 124A.

In this case, the predetermined period of time Ta is a time interval between the first stage fire time T1 of the first stage inflator 9A and the desired second stage fire time T2 of the second stage inflator 9B.

On the contrary, in previous step 116, if it has been decided that $|G|>|G_M|$ (the deceleration G being detected by the acceleration sensor 8 exceeds stored data $G_M$ much more to the negative side), the threshold value VTH at this point of time is held for a predetermined time and is used for the predetermined time as a threshold value to decide whether or not fire of the second stage inflator 9B is requested (see step 117 in FIG. 3).

More particularly, as described in step 108 in FIG. 3, first the threshold value VTH is set based on the magnitude of the deceleration G by using the preset relation and the previously stored conversion table. Then, in this step 117, the threshold value is calculated according to the deceleration G detected at this point of time, and this value is held as the threshold value VTH, which is employed to decide whether or not fire of the second stage inflator 9B is requested, at its maximum until the desired second stage fire time T2 of the second stage inflator 9B, whereby the threshold value can be fixed.

In FIG. 7, a state of fixing the threshold value is shown schematically. In FIG. 7, a point of time T3 is the point of time when $|G>|G_M|$ is satisfied, and the state is indicated by the chain double-dashed line wherein the threshold value at this point of time is held and fixed up to the desired second stage fire time T2 of the second stage inflator 9B.

After the threshold value has been fixed as above, it is decided whether or not the lapse time T from the first stage fire time T1 of the first stage inflator 9A exceeds the predetermined period of time Ta (see step 120 in FIG. 3). If it has been decided that the lapse time T exceeds the predetermined period of time Ta (if YES), the process is then terminated (see step 120 in FIG. 3).

In contrast, in step 120, if it has been decided that the lapse time T does not exceed the predetermined period of time Ta (if NO), it is decided whether or not the speed integral value ΔV at this point of time exceeds the threshold value $V_{TH2}$, which is set by fixing the threshold value in above step 117, to increase to the negative side ($\Delta V < V_{TH2}$) (see step 124A in FIG. 3).

Then, in step 124A, if it has been decided that $\Delta V < V_{TH2}$ is satisfied (if YES), i.e., if it has been decided that the crash is in the state where fire of the second stage inflator 9B is requested, the start signal is output from the CPU 4 to the second stage inflator 9B via the D/A converter 6 and the second interface circuit 7 and then the second stage inflator 9B is fired (see a point labeled by "Fire" in FIG. 7) (see step 126 in FIG. 3).

On the other hand, in step 124A, if it has been decided that $\Delta V < V_{TH2}$ is not satisfied (if NO), i.e. if it has been decided that there is no need to fire the second stage inflator 9B, the process returns to step 102. Then, a series of processes are repeated newly.

In the above second embodiment, an integrating means can be implemented by carrying out step 104 by the CPU 4, a first integral value deciding means can be implemented by carrying out step 108 by the CPU 4, an acceleration deciding means can be implemented by carrying out step 116 by the CPU 4, a second integral value deciding means can be implemented by carrying out steps 117, 120 by the CPU 4, and a start signal outputting means can be implemented by carrying out steps 110, 126 by the CPU 4.

In any of above embodiments, there has been made the explanation such that the above start control can be effected under the premise that the program for executing start control shown in FIG. 2 or FIG. 3 is loaded previously onto the CPU 4. However, this program does not have to be loaded previously onto the CPU 4. That is, first the program is stored in the well known external recording medium and then it may be loaded into the CPU 4 from the external recording medium in execution of start control. As such external recording medium, for example, there are a floppy disk, a hard disk, a magnetic recording medium such as a magnetic tape, etc. Of course, if such recording medium is employed, it is needless to say that respective reading devices (a floppy disk drive, a hard disk drive, etc.) must be provided.

Figure 8:
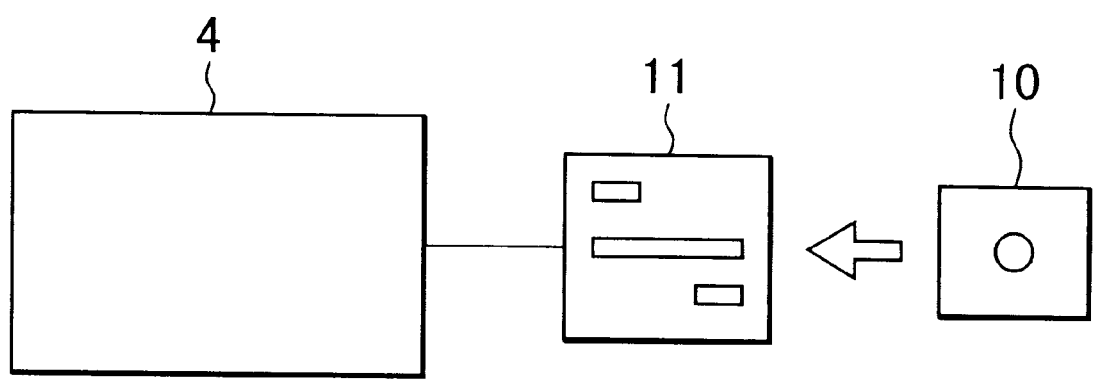
FIG. 8 is a view showing an example of a configuration in which a floppy disk is employed to read the program.

In FIG. 8, an example of a configuration in case a floppy disk 10 is employed as the recording medium for recording the program is shown. Loading of the program in case the floppy disk 10 is employed as the recording medium will be explained with reference to FIG. 8 hereunder.

A floppy disk drive 11 is connected to the CPU 4. The program is recorded previously in the floppy disk 10. By operating the floppy disk drive 11, the program is read from the floppy disk 10 and loaded onto the CPU 4. Then, the program is ready for execution.

As described above, according to the invention, there is considered the fact that, under the situation that fire of both the first stage inflator 9A and the second stage inflator 9B is needed but stagnation of the speed integral value is caused after the first stage inflator 9A has been fired, the deceleration derived after fire of the first stage inflator 9A exceeds the maximum deceleration produced in the type of crash which needs fire of the first stage inflator 9A but not needs fire of the second stage inflator 9B. Then, even if fire of both the first stage inflator 9A and the second stage inflator 9B is needed but stagnation of the speed integral value is caused after the first stage inflator 9A has been fired, the second stage inflator 9B can be fired without fail by adding the time integral value calculated over the area where the deceleration exceeds the maximum deceleration to the speed integral value in the prior art. As a result, start control of the passenger protection system which has two-stage inflators can be executed properly, so that the passenger protection system with higher reliability than the prior art can be provided.

Since fire of the first stage inflator 9A is the necessary condition for fire of the second stage inflator 9B, erroneous inflation of the air bag caused in the clash which does not need the inflation of the air bag or caused on the so-called rough road can be prevented. As a result, the advantage that the reliability can be improved further rather than the prior art can be achieved.

As described above, according to the invention, there is considered the fact that, under the situation that fire of both the first stage inflator 9A and the second stage inflator 9B is needed but stagnation of the speed integral value is caused after the first stage inflator 9A has been fired, the deceleration derived after fire of the first stage inflator 9A exceeds the maximum deceleration produced in the type of crash which needs fire of the first stage inflator 9A but not needs fire of the second stage inflator 9B. Then, even if stagnation of the speed integral value is caused after the first stage inflator 9A has been fired, the second stage inflator 9B can be fired without fail by fixing the threshold value, which is employed to decide the fire of the inflators according to the deceleration, after a predetermined point of time and then comparing the speed integral value with the threshold value. As a result, start control of the passenger protection system which has two-stage inflators can be executed properly, so that the passenger protection system with higher reliability than the prior art can be provided.

Since fire of the first stage inflator 9A is the necessary condition for fire of the second stage inflator 9B, erroneous inflation of the air bag caused in the crash which does not need the inflation of the air bag or caused on the so-called rough road can be prevented. As a result, the advantage that the reliability can be improved further rather than the prior art can be achieved.

What is claimed is:

1. A start controlling method for a passenger protection system, for controlling start of the passenger protection system which has a first inflator and a second inflator and is constructed such that a protection system for protecting passengers of a vehicle is started by firing the first inflator and the second inflator, respectively, in response to a start signal from an external device, said method comprising:

detecting a deceleration of a vehicle;

calculating a speed integral value which is a time integration of the deceleration;

deciding whether or not the speed integral value exceeds a first predetermined threshold value, and then starting the first inflator if it has been decided that the speed integral value exceeds the first predetermined threshold value;

comparing a detected deceleration of the vehicle with a previously stored predetermined deceleration, wherein the previously stored predetermined deceleration corresponds to a maximum deceleration out of decelerations which are detected when firing of the first inflator is needed and firing of the second inflator is not needed and are detected from a fire time of the first inflator to a desired fire time of the second inflator, for a first predetermined time after the first inflator has been started, then deciding whether or not the detected deceleration of the vehicle exceeds the previously stored predetermined deceleration to increase speed reduction, and then executing time integration over an area to calculate a time integral value, in which the detected deceleration of the vehicle exceeds the previously stored predetermined deceleration, for a second predetermined time if it has been decided that the detected deceleration of the vehicle exceeds the previously stored predetermined deceleration to increase the speed reduction;

adding the time integral value to a speed integral value which is calculated as a time integration of the detected deceleration of the vehicle until a point of time when it has been decided that the detected deceleration of the vehicle exceeds the previously stored predetermined deceleration to increase the speed reduction to calculate an added result; and deciding whether or not the added result exceeds a second predetermined threshold value, and then executing start of the second inflator if it has been decided that the added result exceeds the second predetermined threshold value.

2. A start controlling system for a passenger protection system, for controlling start of the passenger protection system which has a first inflator and a second inflator and is constructed such that a protection system for protecting passengers of a vehicle is started by firing the first inflator and the second inflator, respectively, in response to a start signal from an external device, said system comprising:

a first integrating means for executing time integration with respect to a deceleration of a vehicle input from an external device;

a first integral value deciding means for deciding whether or not a value calculated by said first integrating means exceeds a first predetermined threshold value;

an acceleration deciding means for deciding whether or not the deceleration of the vehicle input from the external device exceeds a previously stored predetermined deceleration, wherein the previously stored predetermined deceleration corresponds to a maximum deceleration out of decelerations which are detected when firing of the first inflator is needed and firing of the second inflator is not needed and are detected from a fire time of the first inflator to a desired fire time of the second inflator, after a point of time when it is decided by said first integral value deciding means that the value calculated by said first integrating means exceeds the first predetermined threshold value;

a second integrating means for executing time integration over an area, in which the deceleration of the vehicle input from the external device exceeds the previously stored predetermined deceleration, for a predetermined time after a point of time when it has been decided that the deceleration of the vehicle input from the external device exceeds the previously stored predetermined deceleration;

an adding means for adding an integral value, which is calculated by said first integrating means when it is decided by said acceleration deciding means that the deceleration of the vehicle input from the external device exceeds the previously stored predetermined deceleration, to an integral value calculated by said second integrating means;

a second integral value deciding means for deciding whether or not a value calculated by said adding means exceeds a second predetermined threshold value; and a start signal outputting means for outputting a start signal for the first inflator when it has been decided by said first integral value deciding means that the value calculated by said first integrating means exceeds the first predetermined threshold value, and outputting a start signal for the second inflator when it has been decided by said second integral value deciding means that the value calculated by said adding means exceeds the second predetermined threshold value.

3. A start controlling system for a passenger protection system, for controlling start of the passenger protection system which has a first inflator and a second inflator and is constructed such that a protection system for protecting passengers of a vehicle is started by firing the first inflator and the second inflator, respectively, in response to a start signal from an external device, said system comprising:

a central processing unit, based on a predetermined program loaded from an external device, operable to:

execute time integration with respect to an externally input deceleration of a vehicle, decide whether or not a time integral value exceeds a first predetermined threshold value, and then output a start signal for the first inflator if it has been decided that the time integral value exceeds the first predetermined threshold value, compare a detected deceleration of the vehicle with a previously stored predetermined deceleration, wherein the previously stored predetermined deceleration corresponds to a maximum deceleration out of decelerations which are detected when firing of the first inflator is needed and firing of the second inflator is not needed and are detected from a fire time of the first inflator to a desired fire time of the second inflator, for a first predetermined time after the first inflator has been started, then decide whether or not the detected deceleration of the vehicle exceeds the previously stored predetermined deceleration to increase speed reduction, and then execute time integration over an area to calculate a time integral value, in which the detected deceleration of the vehicle exceeds the previously stored predetermined deceleration, for a second predetermined time thereafter if it has been decided that the detected deceleration of the vehicle exceeds the previously stored predetermined deceleration to increase the speed reduction, add the time integral value to a speed integral value which is calculated as time integration of the detected deceleration of the vehicle until a point of time when it has been decided that the detected deceleration of the vehicle exceeds the previously stored predetermined deceleration to increase the speed reduction to calculate an added result, and decide whether or not the added result exceeds a second predetermined threshold value, and then outputting a start signal for the second inflator is it has been decided that the added result exceeds the second predetermined threshold value;

a memory device operable to store the program, which is executed by said central processing unit, to be readable by said central processing unit;

a D/A converter operable to convert a digital start signal, which is supplied from said central processing unit to the first inflator and the second inflator, into an analog signal; and an interface circuit operable to convert an output signal of said D/A converter into predetermined signals which are suitable for the first inflator and the second inflator, respectively.

4. A start controlling method for a passenger protection system, for controlling start of lie passenger protection system which has a first inflator and a second inflator and is constructed such that a protection system for protecting passengers of a vehicle is started by firing the first inflator and the second inflator, respectively, in response to a start signal from an external device, said method comprising:

detecting a deceleration of a vehicle;

calculating a speed integral value which is a time integration of the deceleration;

deciding whether or not the speed integral value exceeds a predetermined threshold value defined according to a detected deceleration of the vehicle;

starting the first inflator if it has been decided that the speed integral value exceeds the predetermined threshold value defined according to the detected deceleration of the vehicle;

comparing the detected deceleration of the vehicle with a previously stored predetermined deceleration, wherein the previously stored predetermined deceleration corresponds to a maximum deceleration out of decelerations which are detected when firing of the first inflator is needed and firing of the second inflator is not needed and are detected from a fire time of the first inflator to a desired fire time of the second inflator, for a predetermined time after the first inflator has been started, then deciding whether or not the detected deceleration of the vehicle exceeds the previously stored predetermined deceleration to increase speed reduction;

holding a threshold value defined according to the deceleration until termination of the predetermined time thereafter if it has been decided that the detected deceleration of the vehicle exceeds the previously stored predetermined deceleration to increase the speed reduction, and then deciding whether or not the speed integral value exceeds the predetermined threshold value being held for that time duration; and starting the second inflator if it has been decided that the speed integral value exceeds the predetermined threshold value being held.

5. A start controlling system for a passenger protection system, for controlling start of the passenger protection system which has a first inflator and a second inflator and is constructed such that a protection system for protecting passengers of a vehicle is started by firing the first inflator and the second inflator, respectively, in response to a start signal from an external device, said system comprising:

an integrating means for executing time integration with respect to a deceleration of a vehicle input from an external device;

a first integral value deciding means for deciding whether or not a value calculated by said integrating means exceeds a predetermined threshold value defined according to the deceleration of the vehicle;

an acceleration deciding means for deciding whether or not the deceleration of the vehicle input from the external device exceeds a previously stored predetermined deceleration, wherein the previously stored predetermined deceleration corresponds to a maximum deceleration out of decelerations which are detected when firing of the first inflator is needed and firing of the second inflator is not needed and are detected from a fire time of the first inflator to a desired fire time of the second inflator, to increase speed reduction, for a predetermined time after a point of time when it is decided by said first integral value deciding means that the value calculated by said integrating means exceeds the predetermined threshold value defined according to the deceleration of the vehicle;

a second integrating means for holding a threshold value defined according to the deceleration of the vehicle until termination of the predetermined time when it has been decided by said acceleration deciding means that the deceleration of the vehicle input from the external device exceeds the previously stored predetermined deceleration to increase the speed reduction, and then deciding whether or not a value calculated by said integrating means exceeds the predetermined threshold value being held for this time duration; and a start signal outputting means for outputting a start signal for the first inflator when is has been decided by said first integral value deciding means that the value calculated by said first integrating means exceeds the first predetermined threshold value, and outputting a start signal for the second inflator when it has been decided by said second integral value deciding means that the value calculated by said integrating means exceeds the predetermined threshold value being held.

6. A start controlling system for a passenger protection system, for controlling start of the passenger protection system which has a first inflator and a second inflator and is constructed such that a protection system for protecting passengers of a vehicle is started by firing the first inflator and the second inflator, respectively, in response to a start signal from an external device, the system comprising:

a central processing unit, based on a predetermined program loaded from an external device, operable to:

execute time integration with respect to an externally input deceleration of a vehicle, decide whether or not a time integral value exceeds a predetermined threshold value defined according to the externally input deceleration of the vehicle, output a start signal for the first inflator if it has been decided that the time integral value exceeds a predetermined threshold value defined according to a detected deceleration of the vehicle, compare the detected deceleration of the vehicle with a previously stored predetermined deceleration, wherein the previously stored predetermined deceleration corresponds to a maximum deceleration out of decelerations which are detected when firing of the first inflator is needed and firing of the second inflator is not needed and are detected from a fire time of the first inflator to a desired fire time of the second inflator, for a predetermined time after the first inflator has been started, then decide whether or not the detected deceleration of the vehicle exceeds a previously stored predetermined deceleration to increase speed reduction, hold a threshold value defined according to the deceleration if it has been decided that the detected deceleration of the vehicle exceeds the previously stored predetermined deceleration to increase the speed reduction, and then decide whether or not the speed integral value exceeds the predetermined threshold value being held for this time duration, output a start signal for the second inflator if it has been decided that the speed integral value exceeds the predetermined threshold value being held;

a memory device operable to store the program, which is executed by said central processing unit, to be readable by said central processing unit;

a D/A converter operable to convert a digital start signal, which is supplied from said central processing unit to the first inflator and the second inflator, into an analog signal; and an interface circuit operable to convert an output signal of said D/A converter into predetermined signals which are suitable for the first inflator and the second inflator, respectively.

* * * * *

UNITED STATES PATENT AND TRADEMARK OFFICE
CERTIFICATE OF CORRECTION

PATENT NO. : 6,181,998 B1
DATED : January 30, 2001
INVENTOR(S) : Yasumasa Kanameda et al.

It is certified that error appears in the above-identified patent and that said Letters Patent is hereby corrected as shown below:

<u>Claim 3,</u>
Line 47 (column 22, line 5), change "is" to -- if --.

Signed and Sealed this

Thirtieth Day of October, 2001

Attest:

NICHOLAS P. GODICI
Attesting Officer   Acting Director of the United States Patent and Trademark Office